(12) United States Patent
El-Shoubary et al.

(10) Patent No.: US 7,138,010 B1
(45) Date of Patent: Nov. 21, 2006

(54) AMINO PHOSPHORYL TREATED TITANIUM DIOXIDE

(75) Inventors: Modasser El-Shoubary, Crofton, MD (US); M. Kamal Akhtar, Ellicott City, MD (US)

(73) Assignee: Millennium Inorganic Chemicals, Inc., Houston, TX (US)

( * ) Notice: Subject to any disclaimer, the term of this patent is extended or adjusted under 35 U.S.C. 154(b) by 0 days.

(21) Appl. No.: 11/301,135

(22) Filed: Dec. 12, 2005

(51) Int. Cl.
*C09C 1/36* (2006.01)
*C09C 3/08* (2006.01)

(52) U.S. Cl. ............... 106/448; 106/438; 106/443; 106/445; 106/446; 524/121; 524/124; 524/126

(58) Field of Classification Search ............... 106/448, 106/438, 443, 445, 446; 524/126, 121, 124
See application file for complete search history.

(56) References Cited

U.S. PATENT DOCUMENTS

| | | | |
|---|---|---|---|
| 3,767,455 A | 10/1973 | Claridge et al. | 117/65.2 |
| 4,052,223 A | 10/1977 | Howard | 106/300 |
| 5,562,764 A | 10/1996 | Gonzalez | 106/437 |
| 5,837,049 A | 11/1998 | Watson et al. | 106/427 |
| 6,646,037 B1 | 11/2003 | El-Shoubary et al. | 524/413 |
| 6,695,906 B1 | 2/2004 | Hiew et al. | 106/446 |
| 6,765,041 B1 | 7/2004 | El-Shoubary et al. | 523/205 |
| 6,852,306 B1 | 2/2005 | Subramanian et al. | 423/613 |

FOREIGN PATENT DOCUMENTS

EP    401833 A2 * 12/1990

\* cited by examiner

*Primary Examiner*—Anthony J. Green
(74) *Attorney, Agent, or Firm*—Kevin M. Carroll

(57) ABSTRACT

The invention is a pigment comprising titanium dioxide and an amino phosphoryl compound. The pigment of the invention imparts improved physical qualities, such as improved lacing resistance and dispersion, when incorporated into polymers.

14 Claims, No Drawings

AMINO PHOSPHORYL TREATED TITANIUM DIOXIDE

FIELD OF THE INVENTION

This invention relates to a titanium dioxide pigment that has been treated with an amino phosphoryl compound, and its incorporation into polymers.

BACKGROUND OF THE INVENTION

Titanium dioxide pigments have many known applications, particularly for uses in coatings, paper, and plastics. When incorporated into polymers for plastics applications, the titanium dioxide pigment may act as a filler, or it may also be used to impart improved chemical and physical attributes to polymer matrices, including improved thermal stability, decreased chemical activity, and improved lacing resistance. Lacing resistance is particularly important in extruded polymer film applications.

Although untreated titanium dioxide may be useful in polymer applications, it has been found beneficial to treat the pigments prior to use. Pigments may be treated in different ways, including the addition of surface treatments. For instance, U.S. Pat. No. 6,646,037 teaches the treatment of pigments with organosulfonic acid compounds to impart improved physical and chemical qualities to polymeric matrices. U.S. Pat. No. 6,765,041 teaches treating pigments with organo-acid phosphates. In addition, U.S. Pat. No. 5,837,049 teaches treating pigments with an alkylphosphonic acid or ester.

Despite the variety of surface treatments, for various reasons, including cost and desired properties, no known surface treatments are ideal for all applications. Thus, there is always a need to develop new and better treatments for pigments.

SUMMARY OF THE INVENTION

The invention is a novel pigment comprising titanium dioxide and an amino phosphoryl compound. Additionally, the invention is a composition comprising a polymer and the novel pigment. The treated pigment of the invention imparts superior dispersion and greater lacing resistance to polymers into which they are incorporated.

DETAILED DESCRIPTION OF THE INVENTION

The pigment of the invention comprises titanium dioxide and an amino phosphoryl compound. The amino phosphoryl compound is an organic compound that contains at least one amine group and at least one phosphoryl (P=O) group. Amino phosporyl compounds include amino phosphoryl oligomers or polymers containing repeating amine and phosphoryl units. The phosphoryl group is any phosphonic acid, any salt of phosphonic acid, any phosphonate ester, any phosphinic acid, any salt of phosphinic acid, or any phosphinate ester. The salts are preferably ammonium, alkylammonium, alkali, or alkaline earth salts, such as ammonium, tetraethylammonium, sodium, potassium, calcium, magnesium, aluminum, zirconium, and the like. The amine group can be any substituted or unsubstituted amine group that is covalently linked to the phosphonate group. Preferred amino groups have hydrogen or a $C_1$–$C_{22}$ hydrocarbyl bound to the nitrogen atom of the amino group.

The amine and phosphoryl groups of the amino phosphoryl compound can be bound directly to each other, but there is preferably at least one bridging group. Bridging groups contain at least one nonhydrogen atom. Preferred bridging groups include methylene, ethylene, 1,2-phenylene, dimethyl silyl, diphenyl silyl, and methyl phenyl silyl. Particularly preferred bridging groups include methylene and ethylene.

Amino phosphoryl compounds include amino phosphonate compounds and amino phosphinate compounds. Suitable amino phosphonate compounds include alkylamine bis(alkylene phosphonic acid), alkylamine alkylene phosphonic acid, dialkylamine alkylene phosphonic acid, and the salts or esters of the foregoing acids. Suitable examples of amino phosphonate compounds also include nitrilotris(methylene)triphosphonic acid, ethylenediamine tetrakis (methylene phosphonic) acid, aminotri(methylenephosphonate), sodium salt, and diethylenetriaminepentakis (methylenephosphonic acid), diethylenetriamine-penta(methylenephosphonate), sodium salt, diethyl N,N-bis(ethyl)aminomethylphosphonate. Particularly preferred amino phosphonates include ethylamine bis(methylene phosphonic acid, butylamine bis(methylene phosphonic acid, hexylamine bis(m-ethylene phosphonic acid, 2-ethylhexylamine bis(methylene phosphonic acid, and the salts or esters of the above, as well as mixtures of two or more of the above amino phosphonates.

Preferably, the amino phosphonate has the formula:

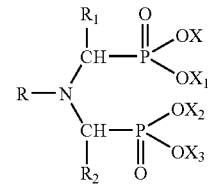

wherein R, $R_1$, and $R_2$ are the same or different H or $C_1$–$C_{22}$ hydrocarbyl, and X, $X_1$, $X_2$, and $X_3$ are the same or different H, $C_1$–$C_{22}$ hydrocarbyl, ammonium, alkylammonium, or alkali metal. More preferably, R is a $C_4$–$C_{18}$ alkyl and $R_1$ and $R_2$ are H.

In another embodiment, the amino phosphonate preferably has the formula:

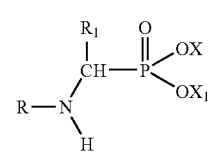

wherein R and $R_1$ are the same or different H or $C_1$–$C_{22}$ hydrocarbyl, and X and $X_1$ are the same or different H, $C_1$–$C_{22}$ hydrocarbyl, ammonium, alkylammonium, or alkali metal. More preferably, R is a $C_4$–$C_{18}$ alkyl and $R_1$ is H.

Suitable amino phosphinate compounds include alkylamine alkylene phosphinic acid, alkylamine alkylene alkylphosphinic acid, dialkylamine alkylene phosphinic acid, and the salts or esters of the foregoing acids.

Preferably, the amino phosphinate has the formula:

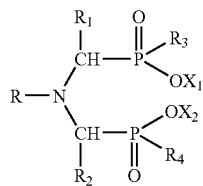

wherein R, $R_1$, $R_2$, $R_3$, and $R_4$ are the same or different H or $C_1$–$C_{22}$ hydrocarbyl, and $X_1$ and $X_2$ are the same or different H, $C_1$–$C_{22}$ hydrocarbyl, ammonium, alkylammonium, or alkali metal. More preferably, R is a $C_4$–$C_{18}$ alkyl and $R_1$, $R_2$, $R_3$, and $R_4$ are H.

In another embodiment, the amino phosphinate preferably has the formula:

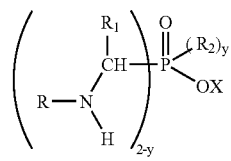

wherein y=0 or 1, R, $R_1$, and $R_2$ are the same or different H or $C_1$–$C_{22}$ hydrocarbyl, and X is H, $C_1$–$C_{22}$ hydrocarbyl, ammonium, alkylammonium, or alkali metal. More preferably, R is a $C_4$–$C_{18}$ alkyl and $R_1$ and $R_2$ are H.

The pigment of the invention also comprises titanium dioxide. Any form of titanium dioxide is suitable for the pigment of the invention. Preferably, the titanium dioxide is in the rutile or anatase form. The titanium dioxide can be prepared by any known process, such as the sulfate process or the chloride process. The titanium dioxide useful in the invention has a typical particle size in the range of 0.001 to 20 μm. For use in typical pigmentary applications, the titanium dioxide preferably has a particle size in the range of from 0.1 to 0.5 μm. For use in photocatalytic applications, the titanium dioxide preferably has a particle size in the range of from 0.001 to 0.1 μm.

The titanium dioxide may be untreated titanium dioxide obtained directly from a production process such as the chloride or sulfate processes. Alternatively, the titanium dioxide may be treated with at least one inorganic oxide coating, such as aluminum oxide, silicon dioxide, zirconium oxide, and the like, prior to treatment with the amino phosphoryl compounds of the present invention. Processes to deposit metal oxides onto a titanium dioxide are well known to those skilled in the art. Preferably, the metal oxides are added by wet treatment or by gas-phase deposition. Suitable wet treatment techniques are taught in U.S. Pat. Nos. 3,767,455, 4,052,223, and 6,695,906, the teachings of which are incorporated herein by reference. Suitable gas-phase deposition techniques are taught in U.S. Pat. Nos. 5,562,764 and 6,852,306, the teachings of which are incorporated herein by reference.

Additionally, the untreated titanium dioxide or the metal oxide treated pigment may be secondarily treated with polyalcohols such as trimethylolethane and trimethylolpropane, alkanolamines such as triethanolamine, inorganic phosphates, and mixtures thereof, prior to, or following, treatment with the amino phosphoryl compounds of the present invention.

The method by which the amino phosphoryl is added to the titanium dioxide is not particularly critical. The amino phosphoryl is typically added to the titanium dioxide as a surface treatment to form the pigment of the invention. If the amino phosphoryl compound is a solid material, it may be added to the titanium dioxide as a solid or may be dissolved in an appropriate solvent, such as water, alcohol (e.g., ethanol), ether (e.g., tetrahydrofuran), or any suitable solvent, before being added to the titanium dioxide.

The amino phosphoryl may be added to the titanium dioxide using any of a variety of well-known addition techniques. For example, the titanium dioxide may be mixed in a solution containing the amino phosphoryl, or the amino phosphoryl may be dissolved in a solvent and then deposited onto the titanium dioxide by evaporating the solvent. An incipient wetness method may also be used. In the simplest of methods, the amino phosphoryl may be added by spraying or pouring it into a system in which the titanium dioxide is already present. It is preferred to mix or to stir the amino phosphoryl and the titanium dioxide in order to maximize the distribution of the amino phosphoryl. Methods for mixing a treatment and a titanium dioxide are well known to persons skilled in the art. Devices such as a V-shell blender equipped with an intensifier bar for application of a liquid to a powder or other suitable mixing devices may be used.

Preferably, the amino phosphoryl is added to the titanium dioxide during the titanium dioxide pigment production process. The processes to produce titanium dioxide pigment typically comprise a $TiO_2$ particle production step (either the sulfate or chloride process) followed by a post treatment process. Where the amino phosphoryl is added to the titanium dioxide pigment production process, it is preferably added during the post treatment steps. Post treatment typically comprises processing the pigment in: one or more treatment tanks, followed by filtering to produce a filter cake; a dryer to dry the filter cake; and a micronizer.

In the treatment tank, an aqueous slurry of titanium dioxide is treated with the amino phosphoryl. The amino phosphoryl and titanium dioxide are preferably thoroughly mixed to ensure even distribution of the amino phosphoryl. Following slurry treatment in the treatment tank, the treated pigment is filtered and washed to produce a filter cake that is further processed.

The amino phosphoryl may also be added during the drying stage. For this stage, the filter cake and the amino phosphoryl may be added as separate feeds to the dryer. Preferably, the amino phosphoryl is added to a fluidized, washed filter cake prior to addition into the dryer. When added to the filter cake prior to addition to the dryer, the amino phosphoryl is preferably added under agitation in order to assure uniform mixing of the amino phosphoryl among the titianium dioxide particles. The pH of the fluidized filter cake prior to addition of the amino phosphoryl is preferably in the range of pH 2 to 11, more preferably in the range of pH 2 to 9.

If added to the micronizer or other high intensity milling device, the amino phosphoryl may be metered into a micronizer along with the pigment powder to be ground. Air or steam micronization techniques may be used at temperatures from room temperature up to 250° C. or higher as is known or easily knowable to persons skilled in the art.

In addition to the post treatment process, the amino phosphoryl may be added during titanium dioxide spray drying. For instance, the amino phosphoryl may be added at the spray dry feeder.

The amount of amino phosphoryl used to treat the titanium dioxide will preferably range from about 0.01 percent to about 10 percent by weight, based on the weight of the titanium dioxide; more preferably from about 0.1 percent to about 6 percent; and most preferably from about 0.1 percent to about 2 percent. The amount of amino phosphoryl used may be higher than 10 percent, particularly for titanium dioxide having small particle size (e.g., <0.1 μm).

The temperature at which the amino phosphoryl compound is added to the titanium dioxide preferably in the range of from about 10° C. to about 270° C. When the amino phosphoryl is added to titanium dioxide during the $TiO_2$ production process, the temperature is mainly dependent on the step in the pigment production process at which the surface treatment occurs.

Once the treated pigment is formed, it may then be combined with a polymer. Suitable polymers include polymers of unsubstituted ethylene monomers, including polyethylene, polypropylene, polybutylene, and copolymers of ethylene with alpha-olefins containing 4 to 12 carbon atoms or vinyl acetate; vinyl homopolymers, acrylic homopolymers and copolymers, polyamides, polycarbonates, polystyrene, acrylonitrile-butadiene-styrenes and polyethers. Other suitable polymer types also include polyvinylchloride, polyurethanes, polysulfones, polyimides, polyesters and chlorinated polyesters, polyoxyethylenes, phenolics, alkyds, amino resins, epoxy resins, phenoxy resins and acetal resins. Most preferably, the polymer is polyethylene, polypropylene, or polystyrene.

The treated pigment may be combined with the polymer and have a loading of up to about 85% by weight, based on the weight of the polymer. Preferably, the loading of treated pigment is about 40% to about 85% by weight based on the weight of the polymer. The polymer and the treated pigment may be combined by any known technique, including using a BR Banbury Mixer.

It has also been found, surprisingly and unexpectedly, that the treated pigments of this invention impart greater lacing resistance to polymers into which they are incorporated. Lacing, which is a believed to be a measure of volatility at specific weight percent pigment loadings and processing temperatures, may manifest as a void or hole in a plastic film.

The following examples merely illustrate the invention. Those skilled in the art will recognize many variations that are within the spirit of the invention and scope of the claims.

EXAMPLE 1

Synthesis of Amino Phosphonates

Aminophosphonic acids are prepared according to the procedures of U.S. Pat. No. 3,567,768 and British Pat. No. 1,023,785.

1A: N-hexyl aminodi(methylenephosphonic acid): In a three-neck round bottom flask connected to a condenser, a separatory funnel, and a thermometer, phosphonic acid (137.5 g, 0.4 moles, Aldrich Chemicals) is mixed with hexylamine hydrochloride (27.5 g, 0.2 moles, from Frinton Lab or Pfaltz & Bauer) and water (5 g) is then added to the mixture. The reaction mixture is heated to approximately 110° C. and the temperature is maintained for about 20–25 minutes. Formaldehyde (35.68 g, 2.2 moles, of 37 wt. % formaldehyde in water with 15% methanol, from Aldrich) is then added drop wise to the reaction mixture through the separatory funnel. The temperature immediately increases to approximately 125° C., but on further addition of formaldehyde, the temperature slowly decreases to a final temperature around 105° C. After formaldehyde addition, the reaction mixture is refluxed for an additional hour. The reaction mixture is then cooled to room temperature, during which a solid of the n-hexyl aminodi(methylenephosphonic acid) is formed. The solid is filtered and washed with copious amounts of water. The collected solid is then used for surface treatment without further purification.

1B: N-octyl aminodi(methylenephosphonic acid: The above procedure is repeated replacing hexylamine hydrochloride with the corresponding octylamine hydrochloride (Acros Chemicals or Pfaltz & Bauer). Please note that octyl aminodi(methylenephosphonic acid) forms not long after the addition of the formaldehyde is completed. Accordingly, refluxing the reaction mixture for an hour, as previously described in the case of the hexyl-analogue, is not necessary. Therefore, one should note that upon the solid (product) formation, the condenser may clog with the product formed which may cause a safety hazard. Accordingly, one should vent the reaction immediately upon solid formation and until the reaction mixture cools to room temperature.

EXAMPLE 2

Preparation of Polymer Matrices Containing Amino Phosphonate Treated Titanium Dioxide Base Pigment: Sodium aluminate (56.5 mL of a 354.0 g $Al_2O_3$/liter solution) is added dropwise to a titanium dioxide slurry (5000 g of sulfate process rutile in a 30 g/L aqueous slurry) with mixing at approximately 40–50° C. The pH is then adjusted to 7.0 with 6N hydrochloric acid and the mixture is allowed to age for another 30 minutes. The resulting slurry is filtered, washed three times with deionized water (at about 25–50° C.), and then dried overnight at 115° C. The dried filtrate is forced through an 8-mesh sieve screen and the resulting alumina coated pigment (Base Pigment) is used for the following amino phosphonate treatments.

Matrix 2A: N-hexyl aminodi(methylenephosphonic acid) (8.4 g, Example 1A) is sprinkled over Base Pigment (1200 g). The pigment is then mixed on a roller mill overnight, steam micronized, and then incorporated in low density polyethylene (LDPE) with concentration 50% and 75% for lacing and dispersion testing, respectively.

The 50% concentration sample is prepared using a Haake Rheocord 9000 Computer Controlled Torque Rheometer. The $TiO_2$ pigment (125 g) and LDPE (125 g, of LDPE 722 manufactured by Dow Chemical Company) are dry blended and added to the 75° C. preheated chamber with rotors running at 50 rpm. One minute after addition of the $TiO_2$/LDPE mixture, the chamber temperature is raised to 105° C. Frictional heat generated by the mixing process is allowed to drive the rate of incorporation of the $TiO_2$ into the PE until a steady state mixture is achieved. The concentrate is removed from the mixing chamber and placed into a Cumberland Crusher to obtain finely granulated 50% concentrate samples. The granulated concentrates are conditioned for 48 hours at 23° C. and 50% relative humidity. These concentrates are then let down into Dow Chemical 722 LDPE to achieve a 20% loading of $TiO_2$ in the final film for testing in lacing experiments below.

The 75% $TiO_2$ concentration sample is prepared using a Haake 3000 Rheomix Mixer. The mixer is controlled and monitored with a Haake 9000 Rheocord Torque Rheometer. micronized $TiO_2$ (337.7 g) and LDPE (112.6 g, of NA209 LDPE manufactured by Equistar Chemical) are dry blended and added to the 75° C. mixing chamber with rotors operating at 50 rpm. The mixer temperature is programmed to increase to 120° C. one minute after the dry blend is introduced to the mixing chamber. After a steady state mixture is achieved, the compound is mixed for an additional 3 minutes. The compound is removed from the chamber and granulated using a Cumberland crusher.

Matrix 2B: 2B is prepared according to the procedure of Matrix 2A, except that 10.8 g of n-hexyl aminodi(methylenephosphonic acid) is used.

Matrix 2C: 2C is prepared according to the procedure of Matrix 2A, except that 8.4 g of n-octyl aminodi(methylenephosphonic acid) is used in place of n-hexyl aminodi(methylenephosphonic acid).

Matrix 2D: 2D is prepared according to the procedure of Matrix 2A, except that 10.8 g of n-octyl aminodi(methylenephosphonic acid) is used in place of n-hexyl aminodi(methylenephosphonic acid).

EXAMPLE 3

Lacing and Dispersion Testing

Lacing Evaluations: The high temperature stability of polymers containing pigments is an important property of commercial polymer films, especially polyethylene film applications. Voiding or "lacing" accompanies the failure of films. Lacing is believed to be a measure of volatility at specific weight percent pigment loadings and processing temperatures. Tests are run using the film with 20% loading of $TiO_2$ prepared from the 50% $TiO_2$ concentrate matrix samples in Example 2.

Lacing evaluations are run on a 1" extruder equipped with a cast film slot die. A temperature profile of 625° F. (329° C.) die, 515° F. (268° C.) clamp ring, 415° F. (213° C.) zone 3, 350° F. (177° C.) zone 2, and 300° F. (149° C.) zone 1 is used. The screw speed is set at about 90 rpm. A 25.4 cm polished chrome chill roll, set in conjunction with the extruder is used to maintain a 75-μm-film thickness, and to cool and transport the films. The chill roll distance from the die lips is about 22 mm and the temperature was about 27° C.

After the sample is placed in the hopper, the material is allowed to purge until the appearance of a white tint in the film is first noted. To ensure the concentration of $TiO_2$ in the film has stabilized, a time interval of two minutes is allowed before lacing observations are recorded and a film sample obtained. The extruder is then purged with LDPE until the film turns clear. Lacing performance is determined by counting the relative size and number of holes generated in a film sample laid out on a dark surface. A 1.0–3.0 rating system is used. A rating of 1 is given to films with no lacing, 2 for films showing the onset of lacing and 3 is given to films with extreme lacing. Increments of 0.1 are used to give an indication of the relative performance between the samples.

Dispersion Testing: Using a small-scale laboratory extrusion apparatus, a measure of pigment dispersion into organic polymers is obtained by measuring the relative amount of pigment trapped onto screens of extruder screen packs. Tests are run using the 75% $TiO_2$ concentrate matrix samples of Example 2.

Dispersion tests are conducted using a Killion single screw extruder, model KL-100 equipped with a 20:1 length to diameter screw. The extruder Is preheated at 330° F. (166° C.), 350° F. (177° C.), 390° F. (199° C.), and 380° F. (193° C.) from zone 1 to the die, respectively, and operated at 70 rpm. A purge of 1000 grams of NA952 LDPE manufactured by Equistar is run through the system, and a new screen pack is installed. The screen pack consists of 40/500/200/100 mesh screens from the die towards the extruder throat. After temperature stabilization, 133.33 grams of granulated 75% $TiO_2$ concentrate sample matrix is fed into the extruder. This is followed with 1500 grams of NA952 purge as the feed hopper empties. After the LDPE purge is extruded, the screens are removed, separated and tested using a relative count technique from the measurements from an X-ray fluorescence spectrometer. The number of $TiO_2$ counts per second is obtained for the 100, 200 and 500 mesh screens in the pack and totaled to obtain the dispersion result. A count result of less than 5000 is considered to represent good dispersion, and less than 2000 is considered to be excellent dispersion.

The lacing and dispersion results are shown in Table 1.

TABLE 1

DISPERSION AND LACING RESULTS

| Sample | Organic | Dispersion (Counts/Second) | Lacing |
|---|---|---|---|
| 2A | N-hexyl amino di(methylenephosphonic acid) | 370 | 1.2 |
| 2B | N-hexyl amino di(methylenephosphonic acid) | 820 | 1.3 |
| 2C | N-hexyl amino di(methylenephosphonic acid) | 900 | 1.4 |
| 2D | N-hexyl amino di(methylenephosphonic acid) | 1080 | 1.2 |

We claim:

1. A pigment comprising titanium dioxide that has been treated with an amino phosphoryl compound, wherein the amino phosphoryl compound is represented by one of the following formulae:

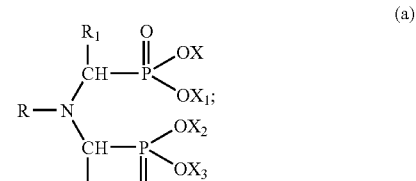

(a)

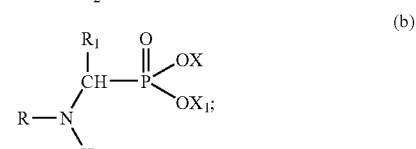

(b)

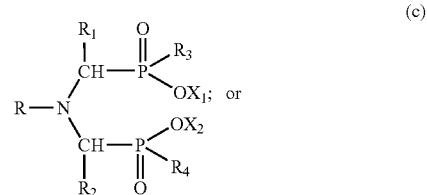

(c)

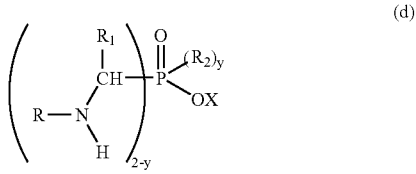

(d)

wherein R, $R_1$, $R_2$, $R_3$, and $R_4$ are the same or different H or $C_1$–$C_{22}$ hydrocarbyl, X, $X_1$, $X_2$, and $X_3$ are the same or different H, $C_1$–$C_{22}$ hydrocarbyl, ammonium, alkylammonium, or alkali metal, and y=0 or 1.

2. The pigment of claim 1 wherein the amino phosphoryl compound has the formula:

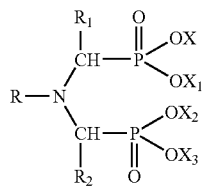

wherein R is a $C_4$–$C_{18}$ alkyl and $R_1$ and $R_2$ are H.

3. The pigment of claim 1 wherein the amino phosphoryl compound has the formula:

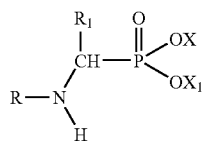

wherein R is a $C_4$–$C_{18}$ alkyl and $R_1$ is H.

4. The pigment of claim 1 wherein the amino phosphoryl compound has the formula:

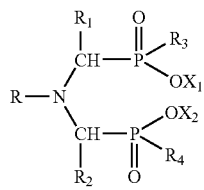

wherein R is a $C_4$–$C_{18}$ alkyl and $R_1$, $R_2$, $R_3$, and $R_4$ are H.

5. The pigment of claim 1 wherein the amino phosphoryl compound has the formula:

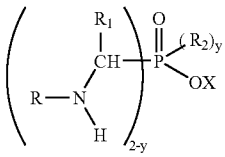

wherein R is a $C_4$–$C_{18}$ alkyl and $R_1$ is H.

6. The pigment of claim 1 wherein the titanium dioxide contains an inorganic oxide coating selected from the group consisting of silicon dioxide, aluminum oxide, zirconium oxide, and mixtures thereof.

7. The pigment of claim 6 wherein the inorganic oxide coating is added to the titanium dioxide by a wet treatment deposition.

8. The pigment of claim 6 wherein the inorganic oxide coating is added to the titanium dioxide by a gas-phase deposition.

9. The pigment of claim 1 wherein the titanium dioxide has a particle size in the range of from 0.001 to 20 µm.

10. The pigment of claim 1 further comprising a polyalcohol, alkanolamine, inorganic phosphate, or mixtures thereof.

11. The pigment of claim 1 wherein the amino phosphoryl compound is present in the amount from about 0.1 to about 6 weight percent, based on the weight of the titanium dioxide.

12. The pigment of claim 1 wherein the amino phosphoryl compound is present in the amount from about 0.1 to about 2 weight percent, based on the weight of the titanium dioxide.

13. A composition comprising a polymer and the pigment of claim 1, wherein the polymer is selected from the group consisting of polyethylenes, polypropylenes, polystyrenes, polycarbonates, polyvinylchlorides, and copolymers of ethylene and $C_{4-12}$ α-olefins.

14. The composition of claim 13 wherein the amount of pigment is from about 40 percent to about 85 percent by weight of the composition.

* * * * *